Patented Mar. 4, 1952

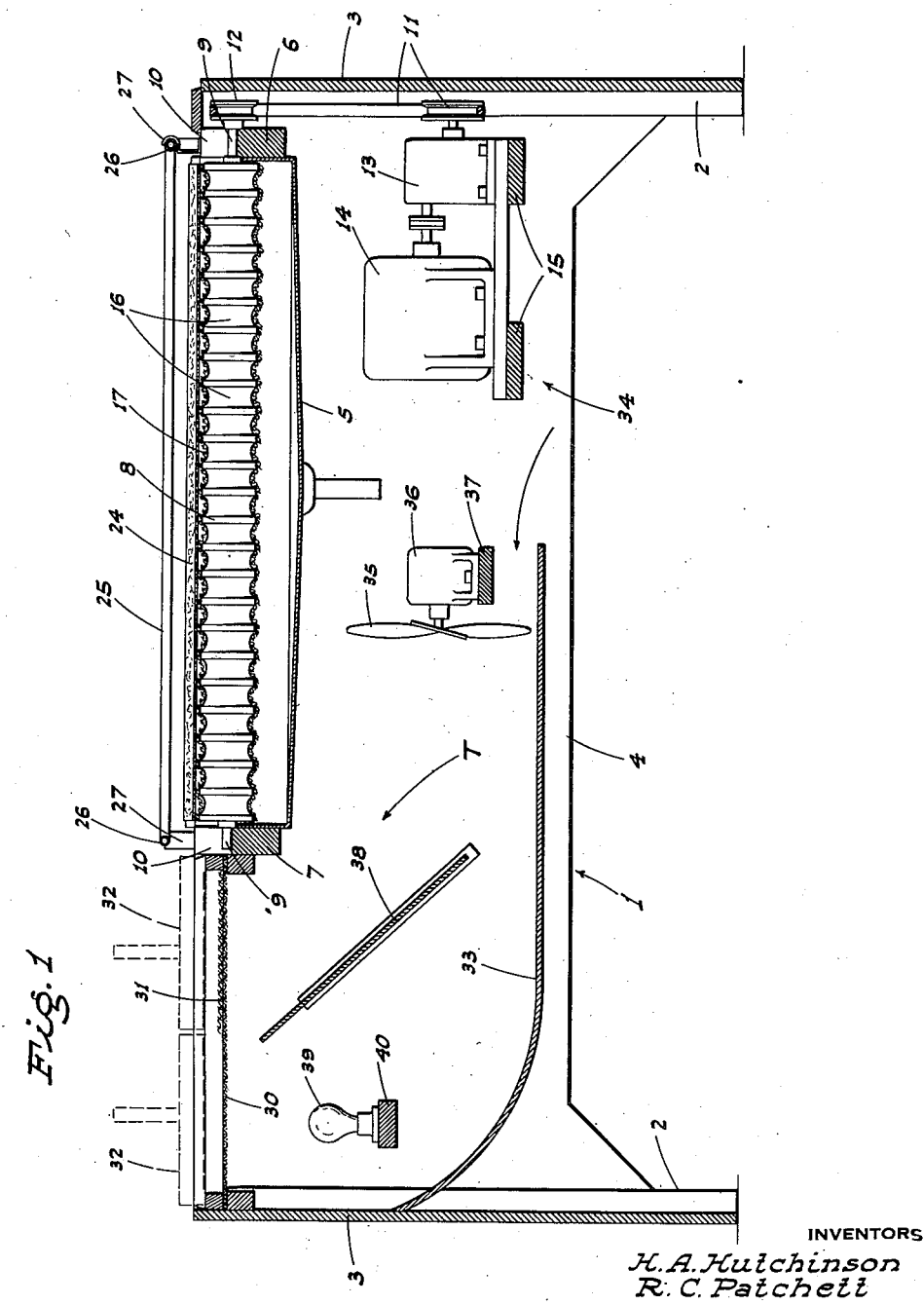

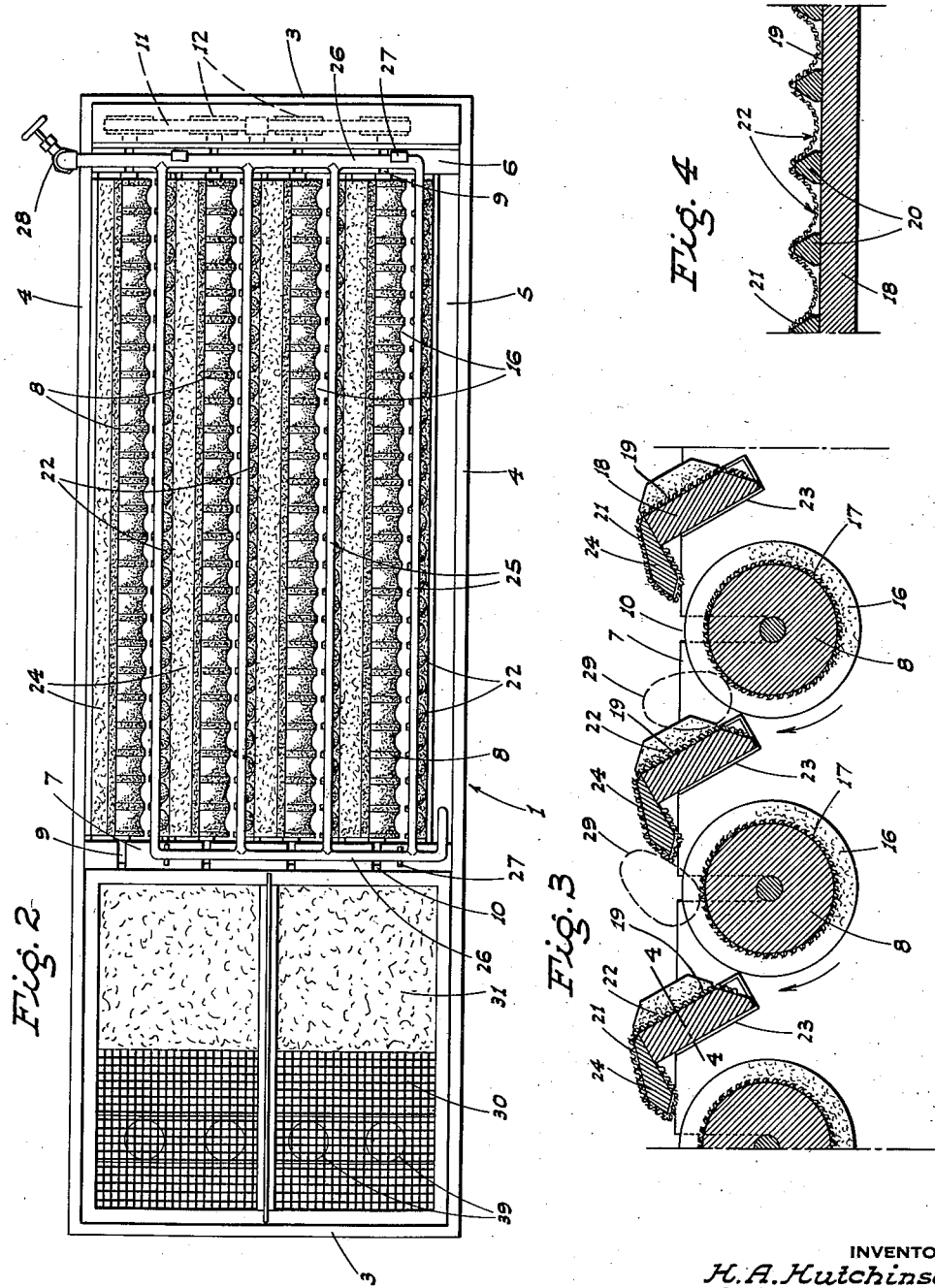

2,587,730

UNITED STATES PATENT OFFICE 2,587,730

EGG CLEANING MACHINE

Harry A. Hutchinson and Roy C. Patchett, Sebastopol, Calif.; said Patchett assignor to said Hutchinson Application October 28, 1947, Serial No. 782,662

3 Claims. (Cl. 15—3.12)

1

This invention is directed to, and it is an object to provide, an improved, power actuated egg cleaning machine.

Another object of the invention is to provide an egg cleaning machine which includes a novel, egg scrubbing assembly comprised of power driven, annularly grooved rollers and combination or unitary egg supporting and stop bars associated therewith in a manner to maintain the eggs in proper engagement with the rollers; the lower parts of the rollers running in water in an open-topped tank, and both the rollers and bars being faced with a coarse cloth, such as toweling, to facilitate the egg cleaning operation.

A further object of the invention is to provide a spray unit above the assembly of the rollers and bars to flush the eggs as they are being scrubbed.

An additional object of the invention is to mount the rollers, the bars, and spray unit for ready removal so that such parts may be cleaned, repaired, or replaced in an easy manner.

It is also an object of this invention to provide each egg supporting bar with egg receiving grooves or pockets of generally concave configuration in facing and matching relation to the grooves of the corresponding roller whereby to maintain each egg rolling in the proper grooves, and to more effectively scrub the eggs.

Another object of the invention is to provide a novel egg drying mechanism in association with the cleaning or scrubbing apparatus; such mechanism including an air fan and heating elements arranged in a unique manner to deliver heated air about the cleaned eggs as then carried in an open, portable rack.

A further object of the invention is to provide a relatively simple, practical, and convenient egg cleaning machine, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal sectional elevation of the improved egg cleaning machine.

Fig. 2 is a top plan view of the same.

Fig. 3 is an enlarged fragmentary cross section showing the arrangement of the rollers and bars in the egg cleaning or scrubbing assembly.

Fig. 4 is an enlarged cross section of one of the egg supporting bars, taken on line 4—4 of Fig. 3.

Referring now more particularly to the characters of reference on the drawings, the machine comprises an upstanding horizontally elongated cabinet, indicated generally at 1, which cabinet includes legs 2 at the corners; end walls 3; and side walls 4.

A tray-type or open-topped tank 5 is mounted in the cabinet 1 adjacent the top thereof by means of a pair of rigid cross beams 6 and 7. The tank is substantially the same width as the cabinet 1, and extends from adjacent one end thereof to a termination short of the opposite end of the cabinet for the purpose hereinafter described.

A plurality of elongated rollers 8 are disposed lengthwise of the tank 5 with the lower portions of said rollers running in the latter. The rollers 8 are disposed in spaced-apart side by side relation, and are supported or journaled, at the ends, by means of projecting spindles 9 which removably seat in upwardly opening notches 10 in the corresponding cross beams 6. As the rollers 8 are relatively heavy, the spindles normally tend to seat in the notches 10, but nevertheless such rollers are readily removable from the machine by merely lifting upwardly thereon.

The rollers 8 are simultaneously driven in the direction indicated by the arrows in Fig. 3, with the same sides thereof turning upwardly, by means of an endless belt and pulley unit 11 including pulleys 12 on the outer end spindles 9. The endless belt and pulley unit 11 is driven from a reduction gear unit 13 operated by an electric motor 14; such reduction gear unit and motor 14 being mounted in the cabinet below the tank 5 by means including cross members 15.

As previously described, the rollers 8 are of such diameter that the lower portion thereof runs in the tank 5, but the upper portions of said rollers are exposed. These rollers 8 each include a plurality of annular grooves 16 and said rollers, including the grooves 16, are faced with a relatively coarse cloth or material, such as toweling, which facing is indicated at 17.

Egg supporting bars 18 extend lengthwise of the machine between the cross beams 7 intermediate the rollers 8, substantially full length thereof, above the horizontal plane of the axes of the latter. These egg supporting bars 18 are disposed with their working faces 19 at an acute angle to the perpendicular, and substantially tangent to the bottom of the grooves 16 on the upwardly moving side of the corresponding roller.

The working faces 19 of the egg supporting bars are provided therealong with spaced, outwardly tapering blocks 20, and a facing 21 of relatively heavy cloth, such as toweling, overlies said working faces, including the blocks 20, whereby to form egg receiving pockets 22 which are of generally concave configuration in facing and matching relation to the grooves 16 of the corresponding roller 8.

The egg supporting bars 18 are carried or mounted at their ends in upwardly opening channel brackets, which permit of easy removal of the bars 18 for cleaning, repair, or replacement.

Affixed to the upper edge of each egg supporting bar 18, in unitary relation, is an egg stop bar 24, which likewise extends full length of the roller assembly and projects at a slight downward incline from said bar 18 in overhanging relation to the next roller 8, terminating adjacent the high point of the latter. As is obvious, the egg stop bars 24 are removable with the corresponding supporting bar 18, and the bars 24 are similarly faced with toweling, as shown.

A plurality of spray pipes 25 extend lengthwise above each of the egg supporting bars 18 and are adapted to discharge downwardly in the direction of said bars; the pipes 25 being supported at opposite ends by manifolds 26 which are in turn detachably supported from the cross beams 6 by supporting brackets 27. A valve 28 regulates water flow to the above described spray pipe unit, which unit is removable from the brackets 27 to permit of ready access to, and removal of, either the rollers 8 or the bar units, including bars 18 and 24.

The above described structure comprises the egg cleaning or scrubbing assembly of the machine, and such assembly functions as follows:

With a quantity of water in the tank 5, and the rollers running therein, eggs 29 are placed one each in the grooves 16 of the rollers 8; said eggs bearing also in the corresponding pocket 22 of the adjacent egg supporting bar 18. As the rollers turn, the eggs are rolled about, being effectively scrubbed by the rough facing 17 of the roller groove 16, and the rough facing 21 of the pockets 22. During this operation the eggs 29 are constantly sprayed from the pipes 25 to flush all dirt from such eggs as they are being scrubbed.

The egg stop bars 24 which overhang each roller 28 prevent any egg which may tend to travel in the corresponding roller groove 16 from passing the high point of the roller. In other words, the bars 24 stop the eggs from traversing with the rollers beyond their high points, which would be undesirable, and cause breakage etc.

By constructing the egg supporting bars 18 and the adjacent egg stop bars 24 in unitary relation, they may be removed as a unit, which is advantageous, and further no separate end mounting is required for said bars 24.

After the eggs have been thoroughly cleaned or scrubbed, they are removed from the rollers 8 and dried in the following manner:

Between the cross beam 7 and the end of the cabinet 1 remote from the tank, there is a rectangular opening in which is mounted a horizontal, perforate or screen platform 30, the inner half of such platform having a drip pad 31 thereon. Cleaned eggs as taken from the rollers 8 are placed directly in open portable racks 32 which first seat on the drip pads 31, and after a time are shifted directly onto the outer or remaining portion of the screen platform 30.

A substantial distance below the screen platform 30, the cabinet 1 includes a bottom plate 33, which extends from the adjacent end wall 3 inwardly to a termination short of the opposite end wall of the cabinet, whereby to leave a bottom opening 34 below the electric motor 14.

Air is sucked through the bottom opening 34 by means of a fan 35 in the cabinet mounted in a position to discharge air through the tunnel T formed between the bottom plate 33 and screen platform 30. The fan 35 is driven by a motor 36 carried on a cross member 37. The air forced through the tunnel 36 by the fan 35 delivers upwardly through the perforate or screen platform 30; there being a diagonally disposed baffle 38 in the tunnel T arranged to cause one part of the stream of air to flow upwardly through that portion of the platform 30 which carries the drip pad 31, and another part of said stream of air to flow through the remaining portion of said platform.

A plurality of heating elements 39, here in the form of electric lights mounted on a cross member 40, are disposed between the baffle 38 and the adjacent end wall 3, acting to heat that part of the stream of air which flows through the outer or unobstructed portion of the platform 30.

The portable racks 32, as initially filled with eggs from the rollers 8, first seat on the drip pad 31 so that excess water may shed from the eggs and be caught by said pad.

In practice, the stream of air which flows against the under side of the drip pad 31 is sufficiently strong to lift said pad into engagement with the lower ends of eggs in the open, portable rack 32 on said pad, whereby to positively pick up, by absorption, water drips on the lower ends of said eggs.

As such pad is constantly subject to a stream of air, evaporation occurs, so that the pad does not become unduly wet.

After the eggs have shed excess water onto the pad 31, the racks 32 are moved outwardly to the unobstructed portion of platform 30, and at this point heated air delivers from the heating elements 39 upwardly through the platform 30 to complete the drying of the eggs. As soon as the eggs are dried the portable racks 32 are removed from the machine for subsequent handling.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an egg cleaning machine, an elongated horizontally disposed driven roller having a plurality of annular egg-locating grooves therein, and means to form, with the upturning side of the roller, a longitudinal substantially V-shaped egg receiving trough open along the top for the placement and removal of eggs, said means comprising an egg supporting bar extending lengthwise of the upturning side of the roller and disposed with its working face above the horizontal axis of the roller and substantially tangent to the bottom of the roller grooves at an acute angle to the perpendicular; said bar being formed on its working face with concave grooves from the top down facing and matching corresponding roller grooves and forming egg receiving pockets with said roller grooves.

2. In an egg cleaning machine, an elongated horizontally disposed driven roller having a plurality of annular egg-locating grooves therein, and means to form, with the upturning side of the roller, a longitudinal substantially V-shaped egg receiving trough open along the top for the placement and removal of eggs, said means comprising an egg supporting bar extending lengthwise of the upturning side of the roller and disposed with its working face above the horizontal axis of the roller at an acute angle to the perpendicular and formed on said face with concave egg locating pockets, open to the top of the bar, facing and matching the corresponding roller grooves.

3. A device as in claim 2, with a liquid spray pipe disposed above and laterally offset from the central portion of the trough, and arranged to discharge liquid downwardly through said pockets.

HARRY A. HUTCHINSON.
ROY C. PATCHETT.

REFERENCES CITED

The following references are of record in the file of this patent:

UNITED STATES PATENTS

| Number | Name | Date |
| --- | --- | --- |
| 40,148 | Smith | Sept. 29, 1863 |
| 901,774 | Boies | Oct. 20, 1908 |
| 1,081,367 | Cook | Dec. 16, 1913 |
| 1,958,720 | Schmidt | May 15, 1934 |
| 2,087,844 | Hansen | July 20, 1937 |
| 2,357,892 | Grant | Sept. 12, 1944 |
| 2,412,407 | Kilbury | Dec. 10, 1946 |
| 2,412,565 | Davis | Dec. 17, 1946 |